US009091321B2

(12) United States Patent
Barber et al.

(10) Patent No.: US 9,091,321 B2
(45) Date of Patent: Jul. 28, 2015

(54) FLUID DAMPERS HAVING TEMPERATURE-DEPENDENT VISCOSITY COMPENSATION AND AUXILIARY POWER UNIT INLET SYSTEMS EMPLOYING THE SAME

(71) Applicant: HONEYWELL INTERNATIONAL INC., Morristown, NJ (US)

(72) Inventors: Tim Daniel Barber, Lichfield Park, AZ (US); Stella Silvana Dearing, Buckeye, AZ (US); Timothy Hindle, Peoria, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 59 days.

(21) Appl. No.: 14/036,886

(22) Filed: Sep. 25, 2013

(65) Prior Publication Data

US 2015/0083534 A1   Mar. 26, 2015

(51) Int. Cl.
*F16F 9/52* (2006.01)
*F16F 9/48* (2006.01)

(52) U.S. Cl.
CPC .... *F16F 9/52* (2013.01); *F16F 9/48* (2013.01)

(58) Field of Classification Search
CPC ............. F16F 9/52; F16F 9/526; F16F 9/325; F16F 9/464; F16F 9/486; F16F 9/466
USPC .......................... 188/276, 277, 286, 289, 318
See application file for complete search history.

(56) References Cited

U.S. PATENT DOCUMENTS

| | | | | |
|---|---|---|---|---|
| 1,492,328 A | * | 4/1924 | Lang | 188/275 |
| 1,828,446 A | * | 10/1931 | Rossman | 188/278 |
| 1,924,372 A | * | 8/1933 | Peteler | 188/278 |
| 1,924,373 A | * | 8/1933 | Peteler | 188/278 |
| 2,589,341 A | | 3/1952 | Chisholm et al. | |
| 2,881,868 A | | 4/1959 | Frykman | |

(Continued)

FOREIGN PATENT DOCUMENTS

| | | |
|---|---|---|
| DE | 102011001900 A1 | 10/2012 |
| GB | 653869 | 5/1951 |
| GB | 993248 | 5/1965 |

OTHER PUBLICATIONS

Lee, D. et al.; Viscous damper development and future trends; The Structural Design of Tall Buildings, Special Issue: Damping and Tall Buildings, vol. 10, Issue 5, (doi/10/1002/tal.v10:5/issuetoc) pp. 311-320, Dec. 2001.

*Primary Examiner* — Thomas J Williams
(74) *Attorney, Agent, or Firm* — Ingrassia & Fisher & Lorenz, P.C.

(57) ABSTRACT

Embodiments of a fluid damper are provided, as are embodiments of an Auxiliary Power Unit inlet system including a fluid damper. In one embodiment, the fluid damper includes a housing assembly containing first and second hydraulic chambers, which are fluidly coupled by way of a flow passage. A plunger is slidably disposed within the housing assembly and is moves through a range of translational positions in response to variations in damping fluid pressure when the fluid damper is filled with damping fluid. An annulus or other restricted flow path is fluidly coupled between the first and second hydraulic chambers and is at least partially defined by the flow passage and the plunger. The restricted flow path has at least one dimension, such as a length, that varies in conjunction with the translational position of the plunger.

19 Claims, 7 Drawing Sheets

(56) References Cited

U.S. PATENT DOCUMENTS

| | | |
|---|---|---|
| 3,104,552 A | 9/1963 | Bouchard |
| 3,107,752 A | 10/1963 | McLean |
| 3,176,800 A * | 4/1965 | Trupp ............................ 188/277 |
| 4,877,222 A | 10/1989 | Davis |
| 5,074,389 A | 12/1991 | Slocum |
| 5,743,362 A | 4/1998 | Clinard et al. |
| 6,129,385 A * | 10/2000 | Blackadder ................... 188/318 |
| 6,547,213 B1 | 4/2003 | Heinz et al. |
| 2001/0016530 A1 | 8/2001 | Grunke et al. |
| 2010/0068036 A1* | 3/2010 | Brill et al. ...................... 415/119 |

* cited by examiner

FLUID DAMPERS HAVING TEMPERATURE-DEPENDENT VISCOSITY COMPENSATION AND AUXILIARY POWER UNIT INLET SYSTEMS EMPLOYING THE SAME

TECHNICAL FIELD

The present invention relates generally to vibration isolation and, more particularly, to embodiments of a fluid damper having a temperature-dependent viscosity compensation device, as well as to embodiments of an auxiliary power inlet system including one or more viscosity-compensated fluid dampers.

BACKGROUND

Fluid dampers are well-known devices designed to attenuate disturbance forces (e.g., vibrations or impact loads) by forcing damping fluid through a restricted flow path, such as an annulus. Fluid dampers are commonly produced to have a constant or fixed annulus, which does not vary in size or shape during operation of the damper. As a result, the damping coefficient of the damper varies in conjunction with changes in damping fluid viscosity, which, in turns, varies with fluctuations in damping fluid temperature. In applications wherein the operative temperature range of the damper is relatively limited, such changes in damping coefficient are often minimal and generally non-consequential. However, in applications wherein the fluid damper is exposed to a relatively broad operative temperature range, undesirably large changes in the damping coefficient of the fluid damper may occur if measures are not taken to compensate for thermally-induced fluctuations in damping fluid viscosity. While certain fluid damper designs have been proposed to address thermally-induced changes in damping fluid viscosity, such designs tend to be limited in one or more respects. For example, fluid dampers have been developed that incorporate materials (e.g., plastics) having relatively large coefficients of thermal expansion (CTEs), which can be leveraged to adjust radial width of an annulus or other restricted flow path as a function of damping fluid temperature; however, the volumetric expansion or contraction of such high CTE materials is still typically inadequate to fully compensate for the relatively large changes in damping fluid viscosity that may occur over a broad operative temperature range, such as an operative temperature range approaching or exceeding 100° Celsius (° C.). Additionally, plastics and other high CTE materials may be subject to undesirable temperature limitations.

There thus exists an ongoing need to provide embodiments of a fluid damper having an improved temperature-dependent viscosity compensation device (referred to herein more simply as a "viscosity compensator"). Ideally, such a viscosity compensator would operative passively and compensate, at least in substantial part, for thermally-induced changes in damping fluid viscosity to minimize fluctuations in damping coefficient over a relatively broad operative temperature range of the fluid damper. It would also be desirable if such a viscosity-compensated fluid damper could be produced as a standalone device or, alternatively, incorporated into a multi-parameter isolator, such as a three parameter isolator. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a viscosity-compensated fluid damper are provided. In one embodiment, the fluid damper includes a housing assembly containing first and second hydraulic chambers, which are fluidly coupled by way of a flow passage. A plunger is slidably disposed within the housing assembly and moves through a range of translational positions in response to variations in damping fluid pressure due to, for example, thermal expansion of the damping fluid. An annulus or other restricted flow path is fluidly coupled between the first and second hydraulic chambers and at least partially defined by the flow passage and the plunger. The restricted flow path has at least one dimension, such as a length, that varies in conjunction with the translational position of the plunger.

In a further embodiment, the viscosity-compensated fluid damper includes a housing assembly containing first and second fluidly-coupled hydraulic chambers. A variable-length restricted flow path is fluidly coupled between first and second hydraulic chamber. The fluid damper includes a viscosity compensator, which is configured to adjust the length of the variable-length restricted flow path in response to variations in damping fluid pressure to at least partially compensate for thermally-induced changes in the viscosity of the damping fluid. Variations in the damping coefficient of the fluid damper, as taken over the operative temperature range of the damper, are reduced as a result.

Embodiments of an Auxiliary Power Unit (APU) inlet system are further provided. In one embodiment, the APU inlet system, includes an APU housing, an inlet door movably coupled to the APU inlet duct, and a fluid damper coupled between the inlet door and the APU inlet duct. The fluid damper includes, in turn, a housing assembly containing first and second fluidly-coupled hydraulic chambers. A variable-length restricted flow path is fluidly coupled between first and second hydraulic chamber. The fluid damper includes a viscosity compensator, which is configured to adjust the length of the variable-length restricted flow path in response to variations in the pressure of the damping fluid, when the fluid damper is filled therewith, to at least partially compensate for thermally-induced changes in the viscosity of the damping fluid and reduce variations in the damping coefficient of the fluid damper over the operative temperature range thereof.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
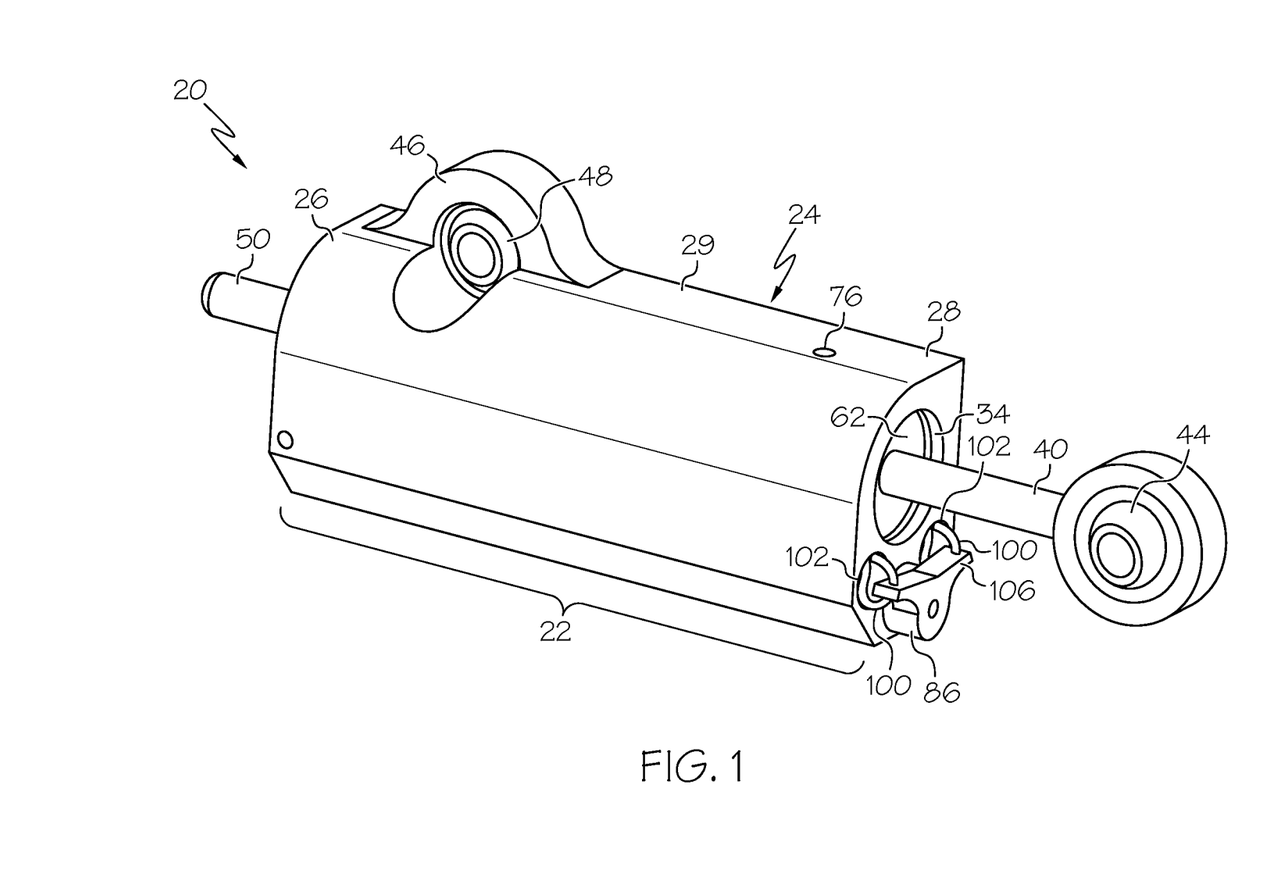
FIGS. 1 and 2 are isometric and exploded views, respectively, of a fluid damper having a temperature-dependent viscosity compensator, as illustrated in accordance with an exemplary embodiment of the present invention.
Figure 2:
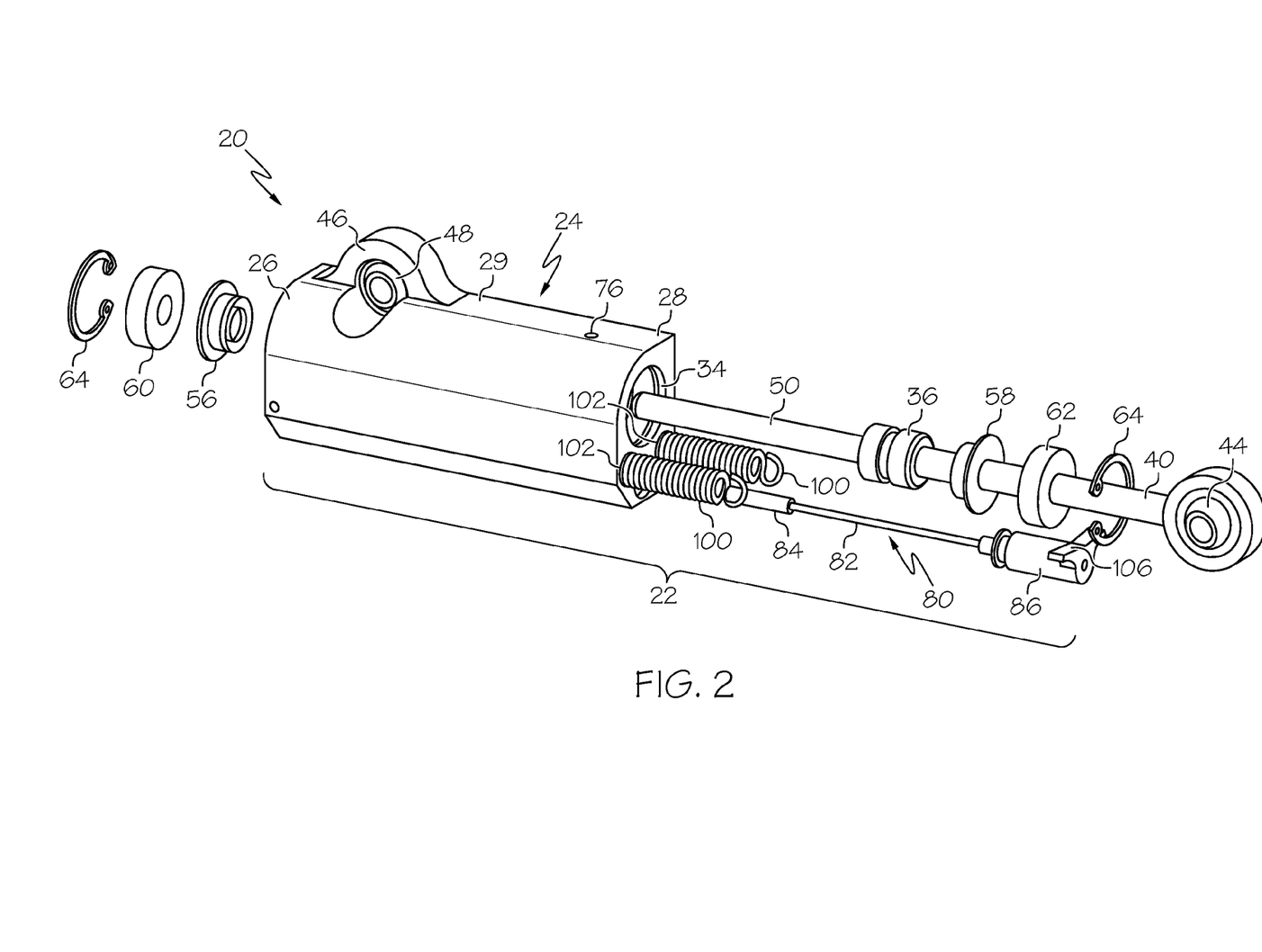

FIGS. 1 and 2 are isometric and exploded views, respectively, of a fluid damper 20 having a temperature-dependent viscosity compensator 22, as illustrated in accordance with an exemplary embodiment of the present invention. Fluid damper 20 is further illustrated in cross-section in FIGS. 3 and 4, as taken along a cut plane extending through the longitudinal centerline of damper 20. Referring collectively to FIGS. 1-4, fluid damper 20 includes a housing assembly 24 having a first end portion 26 and an opposing second end portion 28. Housing assembly 24 may be produced from any number of pieces, which may be assembled in various different manners. In a preferred embodiment, housing assembly includes a main body 29, which is fabricated as a single machined piece from a high temperature metal or alloy; and a number of smaller pieces or components (e.g., seal members 56 and 58, bushings 60 and 62, cover piece 74, etc.), which are attached to main housing body 29 in various manners to yield the completed housing assembly 24.

Figure 3:
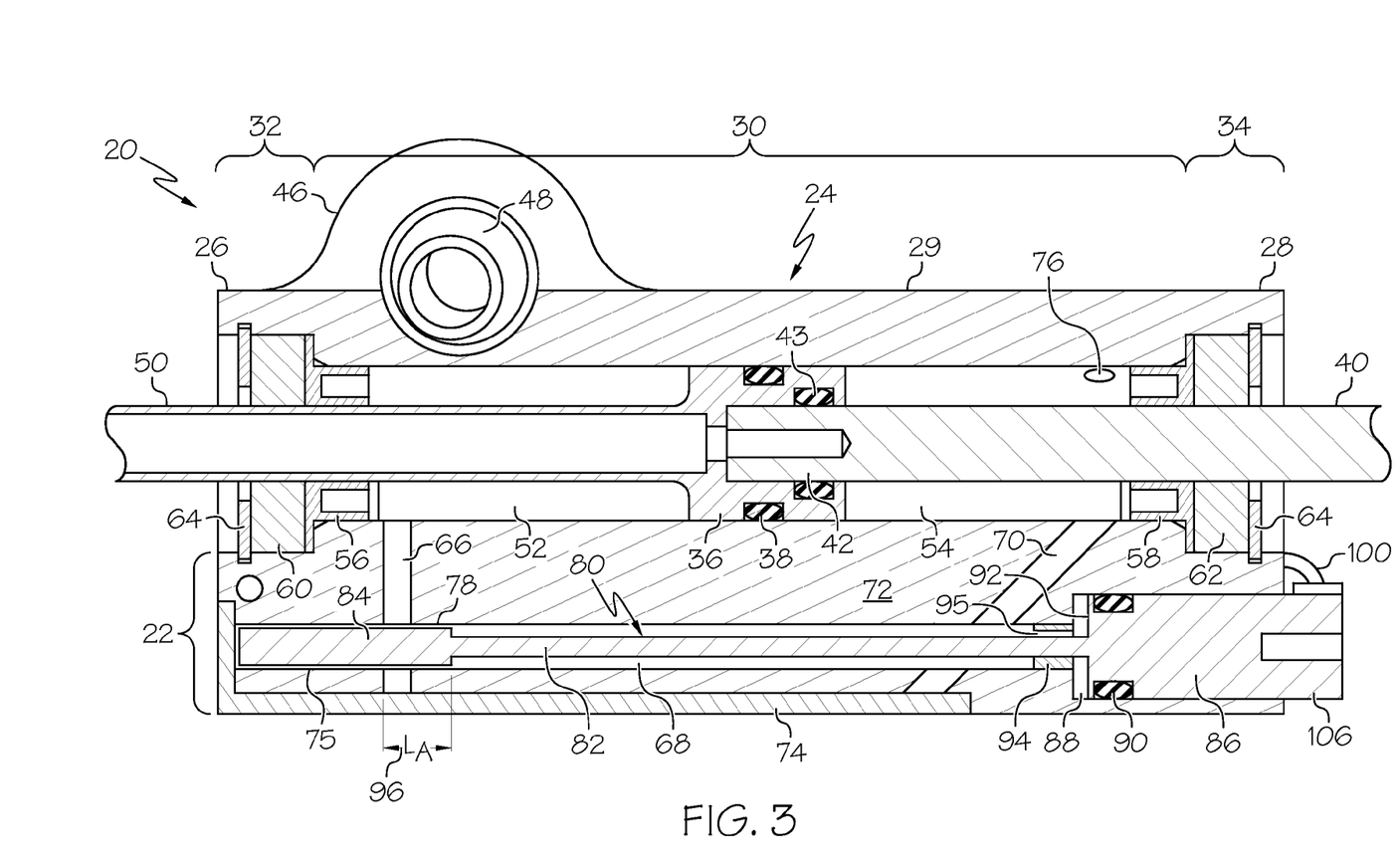
FIGS. 3 and 4 are cross-sectional views of the fluid damper shown in FIGS. 1 and 2, as taken along a longitudinal cut plan extending through center of the fluid damper, illustrating the fluid damper under low temperature (high viscosity) and high temperature (low viscosity) operating conditions, respectively.
Figure 4:
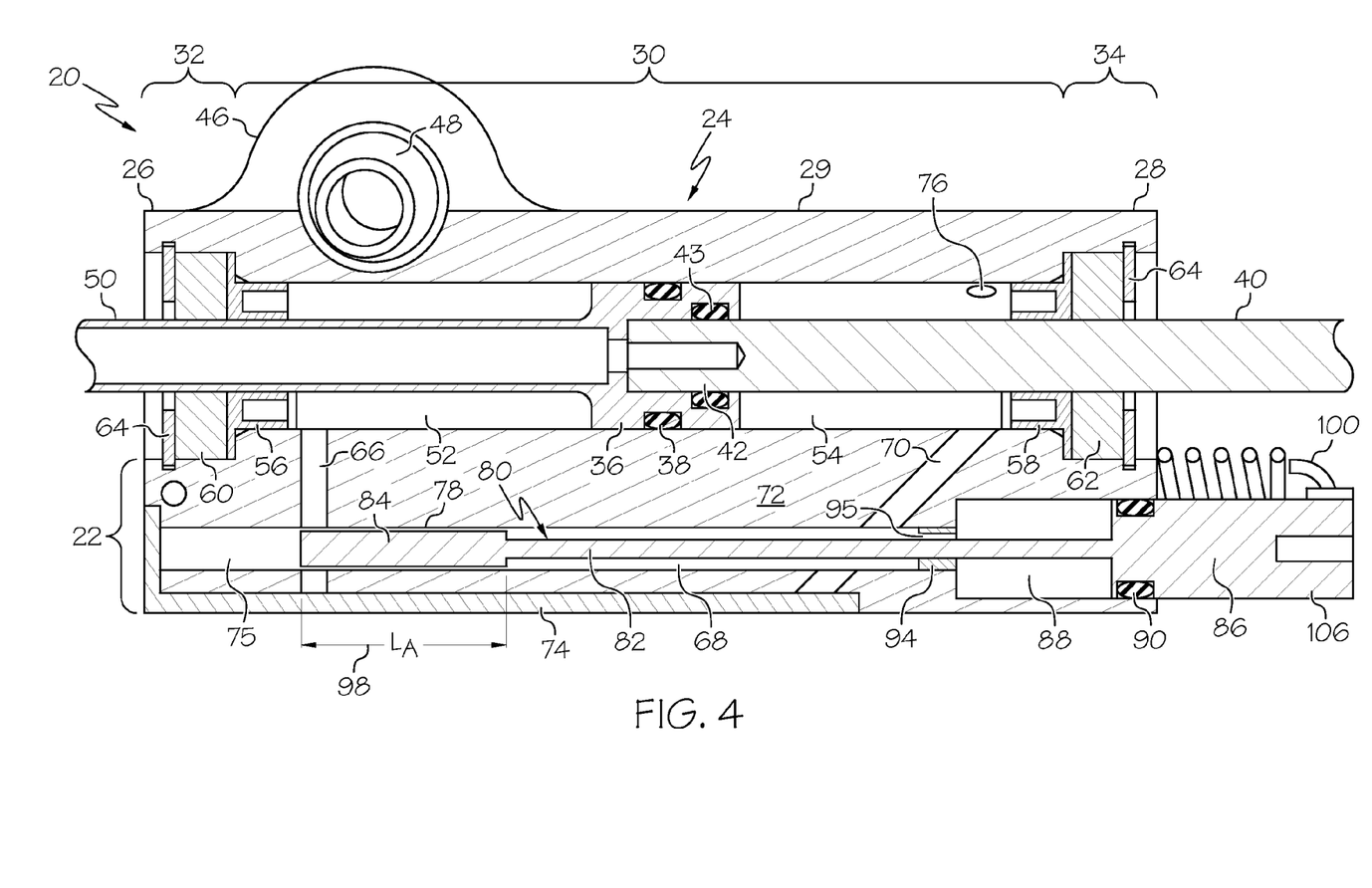

As shown most clearly in FIGS. 3 and 4, a longitudinal channel 30, 32, 34 is formed through housing assembly 24. Longitudinal channel 30, 32, 34 includes an elongated cavity or main cylinder 30, a first enlarged outer diameter ("OD") section 32 joined to a first end of cylinder 30, and a second enlarged OD section 34 joined to a second, opposing end of cylinder 30. Enlarged OD section 32 is exposed through end portion 26 of housing assembly 24, while enlarged OD section 34 is exposed through opposing end portion 28 of housing assembly 24. Longitudinal channel 30, 32, 34 thus extends entirely through housing assembly 24 in the illustrated example; however, this need not be the case in all embodiments. In one embodiment, longitudinal channel 30, 32, 34 is formed as a number of coaxial bores, which are drilled into or through main body 29 of housing assembly 24. A generally cylindrical damper piston 36 is positioned within main cylinder 30. Damper piston 36 may be fabricated to have an outer diameter slightly less than the inner diameter of cylinder 30 to provide a close tolerance fit, while allowing piston 36 to slide axially within cylinder 30. A dynamic seal 38, such as an O-ring, may be disposed around piston 36 and sealingly engage the inner surface of cylinder 30 to minimize or eliminate fluid leakage across the piston-bore interface during operation of fluid damper 20.

A primary shaft 40 extends into cylinder 30 through enlarged OD section 34 to connect with damper piston 36. The inner terminal end of primary shaft 40 may be affixed to damper piston 36 utilizing, for example, a threaded interface 42 (FIGS. 3 and 4); and a static seal 43 (e.g., an O-ring) may be disposed between piston 36 and shaft 40 to prevent damping fluid leakage therebetween. In other embodiments, primary shaft 40 may be affixed to damper piston 36 in another manner or integrally formed therewith as a single machined piece. The outer terminal end of primary shaft 40 serves a first mechanical input/output of fluid damper 20 and is affixed to a spherical bearing 44, as shown in FIGS. 1 and 2. Similarly, main body 29 of housing assembly 24 is fabricated to include a mounting feature 46 having a second spherical bearing 48 (FIGS. 1-4), which serves as a second mechanical input/output of damper 20. Such a spherical bearing mounting interface allows additional freedom of movement of fluid damper 20 during installation of damper 20 and/or as damper piston 36 and primary shaft 40 stroke along the working axis of damper 20. However, such a spherical bearing mounting interface may be unnecessary in many applications and may be replaced by various other types of mounting interfaces, such as a pin joint couplings, in further embodiments.

A secondary shaft 50 extends into cylinder 30 through enlarged OD section 32 to connect with damper piston 36 opposite primary shaft 40. Secondary shaft 50 is affixed to damper piston 36 and may be integrally formed therewith as a single machined piece. Primary shaft 40 and secondary shaft 50 are each fabricated to have an outer diameter substantially less than the outer diameter of piston 36 and the inner diameter of main cylinder 30. In this manner, primary shaft 40 and secondary shaft 50 cooperate with the opposing faces of damper piston 36 and with the inner circumferential surface of cylinder 30 to define two variable-volume hydraulic chambers 52 and 54 within housing assembly 24. Hydraulic chamber 52 is bound by the outer circumferential surface of secondary shaft 50, the inner circumferential surface of cylinder 30, and a first face of damper piston 36. Additionally, chamber 52 is bound by a seal member 56 through which secondary shaft 50 extends; e.g., seal member 56 may be an annular end cap, which is sealingly positioned at (e.g., threaded into and/or bonded to) the juncture between enlarged OD section 32 and main cylinder 30. Similarly, opposing hydraulic chamber 54 is bound by the outer circumferential surface of primary shaft 40; the inner circumferential surface of cylinder 30; a second, opposing face of damper piston 36; and a second seal member 58 (e.g., a second annular end cap), which sealingly plugs the juncture between enlarged OD section 32 and main cylinder 30. First and second bushings 60 and 62 may further be disposed within enlarged OD sections 32 and 34, respectively, to guide the sliding movement of shafts 50 and 40. Bushings 60 and 62 may each be secured in their desired positions utilizing, for example, a retaining ring 64.

Hydraulic chambers 52 and 54 are fluidly coupled by one or more flow passages. In the illustrated example, specifically, hydraulic chambers 52 and 54 are fluidly coupled by three connected conduits or flow passages 66, 68, and 70. As shown most clearly in FIGS. 3 and 4, main flow passage 68 may be formed as a channel extending longitudinally through a lower portion of housing assembly 24 along an axis substantially parallel to main cylinder 30. By comparison, flow passage 66 may be produced as a smaller conduit (e.g., a first cross-bore) formed through an inner wall 72 of housing assembly 24 to fluidly couple main flow passage 68 to hydraulic chamber 52. Similarly, flow passage 70 may be produced as a conduit (e.g., a second cross-bore) formed through inner housing wall 72 to fluidly couple main flow passage 68 to opposing hydraulic chamber 54. An L-shaped cover piece 74 may be affixed over the lower portion of housing assembly 24 to sealingly enclose flow passages 66, 68, and 70. As further shown in FIGS. 3 and 4, a clearance area 75 may be provided adjacent the terminal end flow passage 68. While area 75 may be formed contiguously with passage 68 as a single or continuous bore, clearance area 75 is not considered part of flow passage 68 in that damping fluid need not pass through area 75 when flowing between hydraulic chambers 52 and 54. Fluid damper 20 may initially be produced and distributed without damping fluid, in which case hydraulic chambers 52 and 54 and flow passages 66, 68, and 70 may be filled with a selected damping fluid (e.g., a silicone-based damping fluid) at a chosen juncture after production and prior to usage of damper 20. Filling of the various chambers and flow passages of damper 20 may be accomplished utilizing a fill port 76, which can be sealed (e.g., via deformation of a non-illustrated ball composed of copper, aluminum, or another soft metal) after damper 20 has been filled with damping fluid.

During operation of fluid damper 20, damper piston 36, primary shaft 40, and secondary shaft 50 translate with respect to housing assembly 24. As damper piston 36 slides within main cylinder 30, damping fluid flows between opposing hydraulic chambers 52 and 54, which vary in respective volumes depending upon the translational position of piston 36. In instances wherein movement of damper piston 36 results in a decrease in the volume of hydraulic chamber 52 and a corresponding increase in the volume of hydraulic chamber 54 (that is, when damper piston 36 moves to the left in the illustrated orientation shown in FIGS. 1-4), damping fluid flows from chamber 52; through flow passages 66, 68, and 70; and to chamber 54. Conversely, in instances wherein the movement of damper piston 36 results in an increase in the volume of hydraulic chamber 52 and a decrease in the volume of hydraulic chamber 54 (when damper piston 36 moves to the right in the illustrated orientation), damping fluid flows from chamber 54; through flow passages 70, 68, and 60; and to chamber 52. Damping fluid is forced through at least one restricted flow path (e.g., a flow path that narrows or otherwise decreases in cross-sectional area) when flowing between opposing hydraulic chambers 52 and 54 to provide the desired damping effect. In the illustrated example, this restricted flow path is provided in the form of a generally annular or ring-shaped restricted opening or annulus 78 located within main flow passage 68 and, therefore, fluidly coupled between chambers 52 and 54.

In the sense that annulus 78 is an annular or ring-shaped restricted flow path through which damping fluid is forced to provide damping via viscous fluid loses, annulus 78 functions in much the same manner as do annuli employed within other, conventionally-known fluid dampers. However, annulus 78 is unlike conventional annuli in the sense that at least one dimension of annulus 78 is continually adjusted by viscosity compensator 22 in response to fluctuations in damping fluid pressure (and, therefore, also in response to fluctuations in damping fluid temperature and viscosity) during operation of fluid damper 20. In preferred embodiments, viscosity compensator 22 passively adjusts the length of annulus 78 (identified in FIGS. 3 and 4 as "$L_A$") in response to fluctuations in damping fluid pressure. For this reason, annulus 78 may be referred to more fully as "variable-length annulus 78" or, more generally, as "variable-length restricted flow path 78" hereafter. By adjusting the length of annulus 78 in response to changes in damping fluid pressure, viscosity compensator 22 offsets the effects of thermally-induced changes in damping fluid viscosity to help stabilize the damping coefficient of fluid damper 20 over a broad range of operative temperatures. The manner in which viscosity compensator 22 continually adjusts the length of annulus 78 to compensate for thermally-induced changes in damping fluid viscosity is described in detail below.

Viscosity compensator 22 includes a translating plunger 80 having an elongated stem 82 and an enlarged head 84, which is affixed to an end of stem 82 and may be formed therewith as a single machined piece. Plunger head 84 is enlarged in the sense that the outer diameter of enlarged head 84 is greater than the outer diameter of stem 82, while being less than the inner diameter of flow passage 68. The enlarged head 84 of plunger 80 cooperates with an inner circumferential surface of flow passage 68 to define variable-length annulus 78. As will be described in detail below, the translational position of plunger head 84 is generally determinative of the length $L_A$ of annulus 78, which generally circumscribes or surrounds head 84. Enlarged head 84 of plunger 80 may have a cylindrical geometry and a substantially constant outer diameter, as taken axially along its length. Similarly, flow passage 68 (or at least the region of flow passage 68 over which variable-length annulus 78 may be formed) may have a cylindrical shape and a substantially constant inner diameter, as taken along its length. This example notwithstanding, the possibility that the geometry of head 84 of plunger 80 and/or flow passage 68 may vary across their respective lengths is by no means precluded; e.g., in further embodiments plunger head 84 and flow passage 68 may vary in outer diameter or inner diameter, respectively, by including an area having tapered or stepped geometry.

A compensator piston 86 is fixedly coupled to plunger 80 and translates therewith; e.g., in one embodiment, compensator piston 86 is affixed to stem 82 opposite enlarged head 84 of plunger 80. Compensator piston 86 and plunger 80 are conveniently (although not necessarily) formed as a single piece. Compensator piston 86 is disposed within a compensator chamber 88 provided within housing assembly 24. Compensator chamber 88 may be formed as a cylindrical cavity or bore, which is formed in end portion 28 of housing assembly 24 and which connects with an end of flow passage 68. Compensator chamber 88 may be substantially co-axial with flow passage 68, while the inner diameter of compensator chamber 88 is greater than the inner diameter of flow passage 68. A fluid-tight seal is formed between compensator piston 86 and the inner surface of the bore defining compensator chamber 88. For example, as shown in FIGS. 3 and 4, compensator piston 86 may carry a dynamic seal 90 (e.g., an O-ring), which is sealingly deformed against the walls of chamber 88 when fluid damper 20 is assembled. Compensator chamber 88 is fluidly coupled to main flow passage 68 (and, therefore, to hydraulic chambers 52 and 54) to allow fluid communication between face 92 of piston 86 and the hydraulic fluid contained with damper 20. To support plunger 80, while allowing sliding movement thereof, an annular bushing 94 may be disposed at the juncture of flow passage 68 and compensator chamber 88. Controlled leakage is permitted across bushing 94 to allow the exchange of damping fluid between flow passage 68 and compensator chamber 88. Additionally, if desired, one or more notches or channels 95 may be formed through bushing 94 to facilitate the flow of damping fluid between flow passage 68 and chamber 88, as generally shown in FIGS. 3 and 4.

Plunger 80 and compensator piston 86 are movable between a range of translational positions. As noted above, the translational position of plunger 80 (and, specifically, the translational position of flow-restricting head 84 of plunger 80) is generally determinative of the length of variable-length annulus 78. This may be more fully appreciated by comparing FIG. 3, which illustrates fluid damper 20 when plunger 80 and compensator piston 86 are in a first translational extreme (the leftmost position in the illustrated example); to FIG. 4, which illustrates fluid damper 20 when plunger 80 and compensator piston 86 are in an opposing translational extreme (the rightmost position in the illustrated example). In the translational extreme shown in FIG. 3, only a relatively limited portion of plunger 80 extends into flow passage 68 to impart variable-length annulus 78 with a relatively short length $L_A$ (identified in FIG. 3 by double-headed arrow 96). By comparison, in the translational extreme shown in FIG. 4, the substantial entirety of plunger 80 extends into flow passage 68 to impart annulus 78 with a relatively long length $L_A$ (identified in FIG. 4 by double-headed arrow 98). In this manner, plunger 80 longitudinally encroaches into the portion of flow passage 68 bounding variable-length annulus 78 to varying degrees (depending upon the translational position plunger 80 and piston 86) to determine the overall length $L_A$ of annulus 78. Plunger 80 encroaches into flow passage 68 from clearance area 75, which extends axially from the terminal end of main flow passage 68 adjacent annulus 78 (and opposite compensator chamber 88) to accommodate or house the portion of the plunger head 84 residing outside of flow passage 68.

Figure 5:
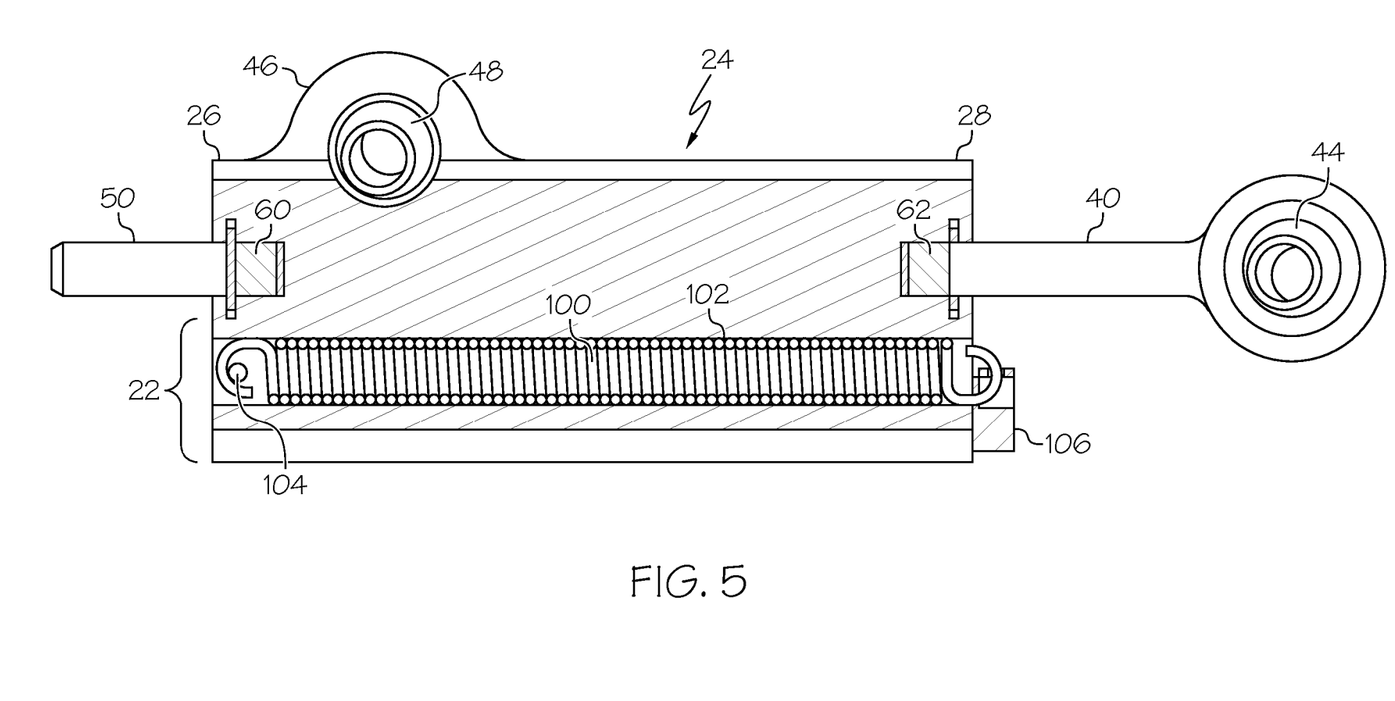
FIG. 5 is a cross-sectional view of the fluid damper shown in FIGS. 1-4, as taken along a longitudinal cut plan extending through a pressurizing spring included within the fluid damper.

Damper 20 may be filled with a sufficient volume of damping fluid to prevent movement of plunger 80 and compensator piston 86 beyond the translational extreme shown in FIG. 3 (due to the generally incompressible nature of the damping fluid). Conversely, one or more biasing elements may prevent movement of plunger 80 and compensator piston 86 beyond the translational position shown in FIG. 4. In this latter regard, first and second extension springs 100 may be coupled between housing assembly 24 and plunger 80. As shown most clearly in FIGS. 1 and 2, springs 100 may be housed within two additional bores or channels 102 formed in main body 29 of housing assembly 24 on opposing sides of flow passage 68. One end of each spring 100 may be attached to housing assembly 24; e.g., as shown in FIG. 5, which is a cross-sectional view of damper 20 taken along a cut plane through one of springs 100, one end of each spring may be hooked onto a peg or post 104 provided in each channel 102. The opposing end of each spring 100 may be hooked onto or otherwise joined to an attachment feature 106 provided on the externally-exposed end of plunger 80. Such a design allows springs 100 to be sized to have a relatively long length and large deflective range, while maintaining the relatively compact form factor of damper 20. In addition to providing a soft stop function, springs 100 bias plunger 80 and compensator piston 86 toward the positional extreme shown in FIG. 3 and "pressurize" the damping fluid contained within damper 20 by exerting a preload force thereon. For this reason, springs 100 may also be referred to as a "pressurizing springs 100" hereafter.

The translational position of plunger 80 and compensator piston 86 is primarily determined by two antagonistic forces: (i) the bias force exerted on piston 86 by pressurizing springs 100 urging movement of plunger 80 and piston 86 toward the translational extreme shown in FIG. 3, and (ii) the force exerted on exposed face 92 of compensator piston 86 by the damping fluid within compensator chamber 88 urging movement of plunger 80 and piston 86 toward the translational extreme shown in FIG. 4. Under low temperature operating conditions, the force exerted on compensator piston 86 by the damping fluid within compensator chamber 88 is insufficient to overcome the bias force exerted on piston 86 by springs 100. Compensator piston 86 and plunger 80 thus remain in the translational extreme shown in FIG. 3, and variable-length annulus 78 is imparted with a relatively short length $L_A$. Under such low temperature operating conditions, the damping fluid temperature will likewise be relatively low and the damping fluid viscosity relatively high. As a result, the relatively viscous or "thick" damping fluid need only pass through a relatively short annulus or restricted flow path when flowing between opposing hydraulic chambers 52 and 54 to accommodate sliding movement of damper piston 36. The relatively short length of variable-length annulus 78 thus compensates for the relatively high viscosity of the damping fluid under such low temperature operating conditions.

As the operating temperature of fluid damper 20 increases, so too does the pressure exerted on face 92 of piston 86 by the expanding damping fluid. When the pressure exerted on piston 86 by the damping fluid is sufficient to overcome the spring bias force exerted thereon, compensator piston 86 and plunger 80 move toward the positional extreme shown in FIG. 4 (to the right in FIGS. 3 and 4) and annulus 78 elongates. Under maximum operating temperature conditions, compensator piston 86 and plunger 80 move fully into the positional extreme shown in FIG. 4 and variable-length annulus 78 is imparted with its maximum possible length $L_A$. As the damping fluid temperature and volume has increased, the viscosity of the heated damping fluid has decreased proportionally. Movement of damping piston 36 and the corresponding flow of damping fluid between hydraulic chambers 52 and 54 now requires that a relatively low viscosity or "thin" damping fluid pass through a relatively long annulus 78. In this manner, the relatively long length of variable-length annulus 78 compensates for the relatively low viscosity of the damping fluid under high temperature operating conditions.

In the above-described manner, viscosity compensator 22 functions to minimize fluctuations in the damping coefficient of fluid damper 20 due to the thermally-induced changes in damping fluid viscosity. Advantageously, the stroke of plunger 80 is generally limited only by packaging constraints and not by, for example, reliance on volumetric expansion or contraction of a thermostat or other structure fabricated from a high CTE material. As a result, a relatively large disparity between the minimum and maximum lengths of annulus 78 can be achieved to enable viscosity compensator 22 to effectively compensate for changes in damping fluid viscosity over a relatively large temperature range. For example, in one embodiment, the maximum length of variable-length annulus 78 (again identified FIG. 4 by double-headed arrow 98) may be at least twice the minimum length of annulus 78 (identified in FIG. 3 by double-headed arrow 96). Stated more generically, plunger 80 is movable between: (i) a first position (the position shown in FIG. 3) in which the restricted flow path dimension (the length of annulus 78) is a predetermined minimum value, and (ii) a second position (the position shown in FIG. 4) in which the restricted flow path dimension is a predetermined maximum value, which is preferably at least twice the predetermined minimum value. As a further advantage, by orienting plunger 80 and compensator piston 86 to translate along an axis that is substantially parallel to the working axis of damper 20 (that is, the axis along which damper piston 36, shaft 40, and shaft 50 translate), fluid damper 20 is imparted with a highly compact envelope.

As a still further advantage, viscosity compensator 22 allows the damping coefficient of fluid damper 20 to be readily tuned in a number of different manners. For example, the damping coefficient of fluid damper 20 may be tuned by adjusting the initial translational position of plunger 80 and/or the translational range of plunger 80 over the operative temperature range of fluid damper 20. This may be accomplished by adding or removing damping fluid from damper 20, while interchanging springs 100 for springs of greater or lesser stiffness. Additionally, in certain embodiments, it may be possible to manually adjust the longitudinal distance between plunger head 84 and damper piston 86 (e.g., utilizing a non-illustrated threaded interface to adjust the length of stem 82) and thereby tune the damping coefficient of fluid damper 20. As a further possibility, the damping coefficient of fluid damper 20 can be fine tuned utilizing a trail-and-error process during which the damping coefficient of damper 20 is repeatedly tested; and, if the damping coefficient is not within close range of a target damping coefficient, removing small amounts of material from flow passage 68 to gradually increase the size of annulus 78 until the target damping coefficient is reached. Notably, such methods of tuning the damping coefficient of fluid damper 20 are generally more convenient than is the commonly-performed process of repeatedly filling, draining, and refilling damper 20 with different grades of damping fluid until the desired damping coefficient is achieved; although the possibility that fluid damper 20 may also be tuned in this manner is by no means precluded.

Figure 6:
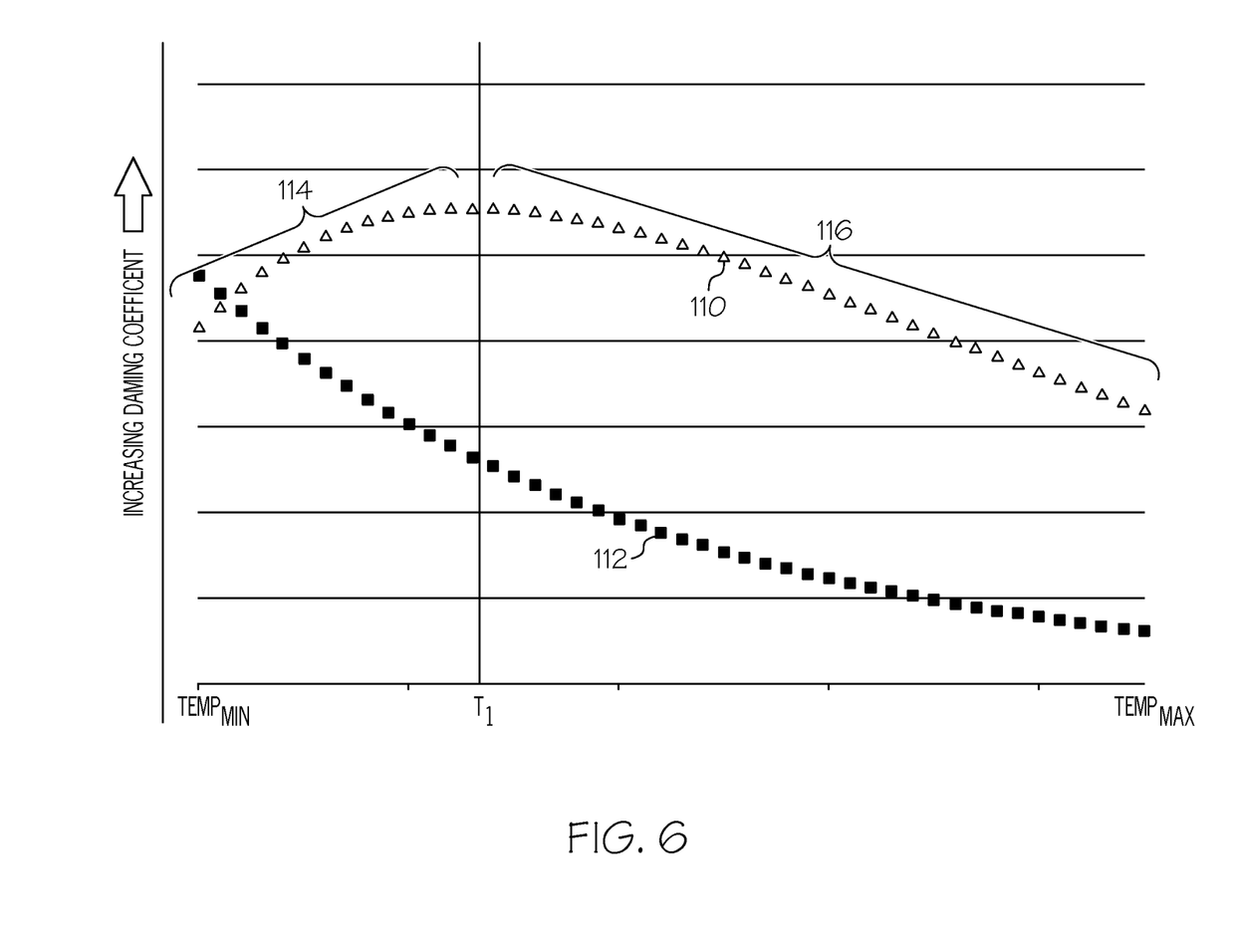
FIG. 6 is a graph of damping coefficient versus temperature illustrating the damping profile of the fluid damper illustrated in FIGS. 1-5 as compared to a fluid damper lacking a temperature-dependent viscosity compensator.

FIG. 6 is a graph of damping coefficient (vertical axis) versus damping fluid temperature (horizontal axis) plotting the damping profile of damper 20 (curve 110) relative to the damping profile of a comparable damper lacking viscosity compensator 22 (curve 112). The minimum and maximum operating temperatures of fluid damper 20 are identified in FIG. 6 as "$TEMP_{MIN}$" and "$TEMP_{MAX}$," respectively, and will vary amongst different embodiments; however, by way of non-limiting example, the minimum and maximum operating temperatures of damper 20 may be about −55° C. and about 65° C., respectively. As can be seen, viscosity-compensated fluid damper 20 provides a damping profile (curve 110) wherein the range between minimum and maximum damping coefficients is considerably less than the range between minimum and maximum damping coefficients of the comparable damper lacking viscosity compensation (curve 112). As further indicated in FIG. 6, viscosity compensator 22 may be tuned such that the damping profile 110 of damper 20 includes: (i) an initial portion 114 having a positive slope such that the damping coefficient of damper 20 gradually increases with increasing temperature up to a predetermined breakpoint temperature $T_1$ (about −20° C. in the illustrated example), and (ii) a subsequent portion 116 having a negative slope such that the damping coefficient of damper 20 gradually decreases with increasing temperature after the predetermined breakpoint temperature $T_1$ has been surpassed.

Figure 7:
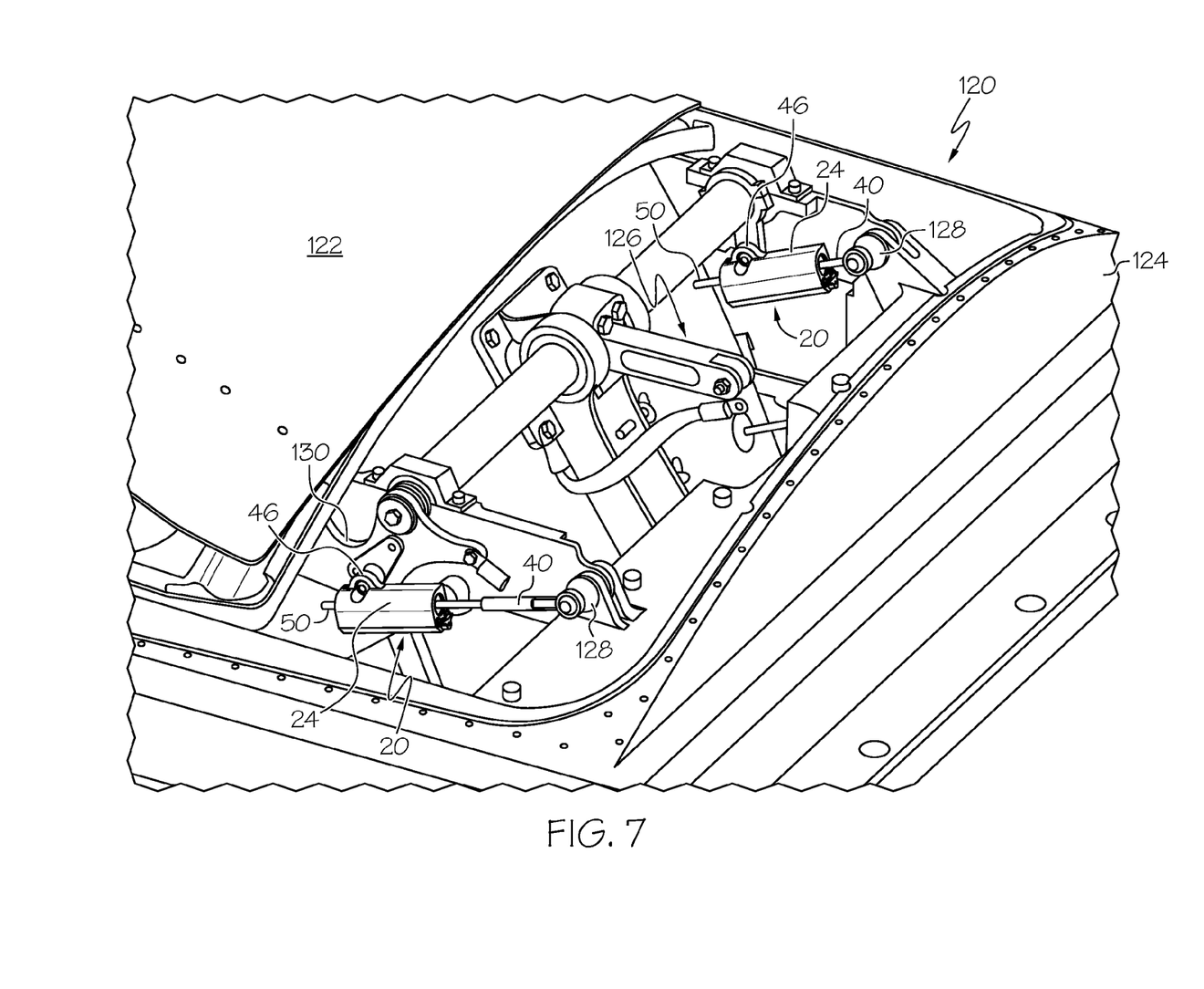
FIG. 7 is an isometric view illustrating an exemplary manner in which one or more of the fluid dampers shown in FIGS. 1-5 may be incorporated into a larger system, such as the inlet section of an auxiliary power unit (partially shown).

Viscosity-compensated fluid damper 20 can be utilized in any application without limitation. However, fluid damper 20 will typically be most usefully employed in applications wherein it is desired to providing damping over a relatively broad temperature range (e.g., a temperature range approaching or exceeding about 100° C.), while minimizing fluctuations in damping coefficient to improve damping performance. To provide one example, FIG. 7 illustrates an Auxiliary Power Unit (APU) inlet system 120 into which two fluid dampers 20 may be advantageously integrated. APU inlet system 120 includes an APU inlet duct assembly 124 (referred to hereafter simply as "APU inlet duct 124") having at least one inlet door 122 movably attached thereto by way of a linkage system 126. As shown in FIG. 7 at 128, one end of each fluid dampers 20 (e.g., the outer terminal end of main shaft 40) may be coupled to the APU inlet duct 124, while the other end (e.g., mount feature 46 of damper housing assembly 24) may be mounted to an arm 130 included within linkage system 126 and attached to door 122. During operation of APU, inlet door 122 may be moved into an open position (shown in FIG. 7) to allow the intake of ambient air into the APU. The air drawn into APU inlet system 120 may impinge upon inlet door 122 and generate disturbance forces, which may be transmitted to APU inlet duct 124 and result in undesirable vibrations, noise production, and the like. Fluid dampers 20 serve to minimize the transmission of such disturbance forces by, for example, reducing the amplitude of vibratory forces imparted to APU inlet duct 124 during APU operation. Due to the inclusion of viscosity compensators 22 within dampers 20, fluid dampers 20 can be tuned to provide near constant damping coefficients over the operative temperature range of APU inlet system 120, which may be relatively broad due to combustion occurring operation of the APU. Tuning of dampers 20 is simplified as a result, and the overall isolation performance of dampers 20 is improved.

There has thus been provided an exemplary embodiment of a fluid damper including a viscosity compensator, which minimizes fluctuations in damping coefficient due to the thermally-induced change in damping fluid viscosity. In the above-described exemplary embodiment, the viscosity compensator leveraged thermally-induced changes to damping fluid volume to offset temperature effects on damping fluid viscosity. In preferred embodiments, the thermal expansion of the damping fluid was utilized to alter the length of a restricted flow path (e.g., an annulus) such that, as the damping fluid expands and contracts over the operative temperature range of the damper, the length of the restricted path increases or decreases, respectively. Advantageously, the above-described fluid damper is also highly compact and can be implemented as a standalone device; or, alternatively, incorporated into a multi-parameter isolator, such as a three parameter isolator. The above-described viscosity compensator can be integrated into virtually any damper design wherein damping fluid flow occurs between two or more variable-volume hydraulic chambers. In further embodiments, the hydraulic chambers may be defined utilizing components other than a piston slidably disposed within a cylinder; for example, in certain cases, the hydraulic chambers may be bound along their inner or outer circumferences by internally- or externally-pressurized bellows, which may be sealing joined to opposing faces of a piston suspended between the bellows.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A fluid damper configured to be filled with a damping fluid, the fluid damper comprising:
   a housing assembly;
   first and second hydraulic chambers within the housing assembly;
   a flow passage fluidly coupling the first and second hydraulic chambers;
   a plunger slidably disposed within the housing assembly and movable through a range of translational positions in response to variations in the pressure of the damping fluid when the fluid damper is filled therewith;
   a restricted flow path fluidly coupled between the first and second hydraulic chambers and at least partially defined by the flow passage and the plunger, the restricted flow path having a length that varies in conjunction with the translational position of the plunger; and
   a compensator piston fixedly coupled to the plunger and having a face exposed to the damping fluid when the damper is filled therewith;
   wherein the plunger at least partially compensates for thermally-induced changes in the viscosity of the damping fluid during operation of the fluid damper by moving between (i) a first position in which the length of the restricted flow path is a predetermined minimum value, and (ii) a second position in which the length of the restricted flow path is a predetermined maximum value at least twice the predetermined minimum value.

2. The fluid damper of claim 1 further comprising:
a channel formed in the housing assembly to one side of the flow passage; and
a pressurizing spring disposed in the channel and coupled between the housing assembly and the plunger, the pressurizing spring urging movement of the plunger toward the first position and exerting a preload force through the plunger on the damping fluid when the fluid damper is filled therewith.

3. The fluid damper of claim 1 wherein the restricted flow path comprises an annulus bound by an outer circumferential surface of the plunger and an inner circumferential surface of the flow passage.

4. The fluid damper of claim 1 further comprising a clearance area within the housing assembly adjacent the restricted flow path and outside of the flow passage, the plunger having an enlarged head partially defining the restricted flow path and extending into the clearance area.

5. The fluid damper of claim 1 wherein the pressure exerted on the face of the compensator piston urges movement of the plunger toward the second position.

6. The fluid damper of claim 4 wherein the enlarged head longitudinally encroaches into the flow passage from the clearance area to varying degrees depending upon the translational position of the plunger to determine the length of the restricted flow path.

7. The fluid damper of claim 5 further comprising a spring biasing the plunger toward the first position.

8. The fluid damper of claim 7 wherein the spring is coupled between the housing assembly and the compensator piston.

9. The fluid damper of claim 1 further comprising a compensator chamber formed, at least in part, by the face of the compensator piston and the housing assembly, the compensator chamber having an inner diameter greater than the inner diameter of the flow passage.

10. The fluid damper of claim 1 wherein the plunger comprises:
an enlarged head cooperating with the flow passage to define, at least in substantial part, the restricted flow path; and
an elongated stem extending axially from the enlarged head to the compensator piston.

11. The fluid damper of claim 10 wherein the enlarged head has a substantially constant diameter, as taken along its length; and
wherein portion of the flow passage with which the enlarged head cooperates to substantially define the restricted flow path has a substantially constant inner diameter, as taken along its length.

12. The fluid damper of claim 10 wherein the elongated stem extends within the flow passage.

13. The fluid damper of claim 1 further comprising:
a longitudinal channel formed in the housing assembly; and
a damper piston slidably mounted within the longitudinal channel, the damper piston cooperating with the longitudinal channel to define, at least in part, the first and second hydraulic chambers.

14. The fluid damper of claim 13 wherein the damper piston is movable along an axis substantially parallel to the axis along which the plunger translates.

15. The fluid damper of claim 13 wherein the flow passage and the longitudinal channel are formed as substantially parallel bores extending through the housing assembly.

16. An Auxiliary Power Unit (APU) inlet system, comprising:
an APU inlet duct;
an inlet door movable coupled to the APU inlet duct; and
a fluid damper coupled between the inlet door and the APU inlet duct, the fluid damper comprising:
a housing assembly;
a first and second hydraulic chambers within the housing assembly, the first hydraulic chamber fluidly coupled to the second hydraulic chamber;
a variable-length restricted flow path fluidly coupled between first and second hydraulic chamber; and
a viscosity compensator configured to adjust the length of the variable-length restricted flow path in response to variations in the pressure of the damping fluid when the fluid damper is filled therewith to at least partially compensate for thermally-induced changes in the viscosity of the damping fluid and reduce variations in the damping coefficient of the fluid damper over the operative temperature range thereof;
wherein the viscosity compensator adjusts the length of the variable-length restricted flow path such that the damping coefficient of the fluid damper increases with increasing damping fluid temperature over an initial portion of the operative temperature range, and decreases with increasing fluid temperature over a subsequent portion of the operative temperature range.

17. A fluid damper configured to be filled with a damping fluid and having an operative temperature range, the fluid damper comprising:
a housing assembly;
a first and second hydraulic chambers within the housing assembly, the first hydraulic chamber fluidly coupled to the second hydraulic chamber;
a variable-length restricted flow path fluidly coupled between first and second hydraulic chamber; and
a viscosity compensator configured to adjust the length of the variable-length restricted flow path in response to variations in the pressure of the damping fluid when the fluid damper is filled therewith to at least partially compensate for thermally-induced changes in the viscosity of the damping fluid and reduce variation in the damping coefficient of the fluid damper over the operative temperature range thereof;
wherein the viscosity compensator adjusts the length of the variable-length restricted flow path such that the damping coefficient of the fluid damper increases with increasing damping fluid temperature over an initial portion of the operative temperature range, and decreases with increasing fluid temperature over a subsequent portion of the operative temperature range.

18. The fluid damper of claim 17 wherein viscosity compensator comprises a plunger movable through a range of translational positions defining the length of the variable-length restricted flow path, and wherein the variable-length restricted flow path comprises a variable-length annulus circumscribing at least a portion of the plunger.

19. The fluid damper of claim 17 wherein the variable-length restricted flow path comprises an annulus, and wherein the viscosity compensator comprises a plunger slidably mounted in the housing assembly and bounding an inner circumference of the annulus.

* * * * *